United States Patent [19]

Stipp et al.

[11] Patent Number: 4,946,702

[45] Date of Patent: Aug. 7, 1990

[54] LOW VISCOSITY ORANGE JUICE CONCENTRATES USEFUL FOR HIGH BRIX PRODUCTS HAVING LOWER PSEUDOPLASTICITY AND GREATER DISPERSIBILITY

[75] Inventors: Gordon K. Stipp; Chee-Hway Tsai, both of West Chester, Ohio

[73] Assignee: The Procter & Gamble Company, Cincinnati, Ohio

[21] Appl. No.: 175,708

[22] Filed: Mar. 31, 1988

[51] Int. Cl.$^5$ ................................................ A23L 2/02
[52] U.S. Cl. ....................................... 426/599; 426/519
[58] Field of Search ........................ 426/330.5, 599, 519

[56] References Cited

U.S. PATENT DOCUMENTS

| | | | |
|---|---|---|---|
| 3,227,562 | 1/1966 | Houghtaling | 426/599 |
| 3,352,693 | 1/1967 | Berk | 99/205 |
| 3,711,294 | 1/1973 | Atkins | 426/599 |
| 3,917,867 | 11/1975 | Atkins | 426/492 |
| 4,244,981 | 1/1981 | Blake | 426/567 |
| 4,352,573 | 10/1982 | Pandolfe | 366/176 |
| 4,356,195 | 10/1982 | Kahn | 426/51 |
| 4,383,769 | 5/1983 | Pandolfe | 366/337 |
| 4,413,017 | 11/1983 | Loader | 426/616 |
| 4,463,025 | 7/1984 | Stobel | 426/599 |
| 4,690,827 | 9/1987 | Kupper et al. | 426/548 |

FOREIGN PATENT DOCUMENTS

| | | | |
|---|---|---|---|
| 202018 | 11/1954 | Australia | 426/599 |
| 118034 | of 1984 | European Pat. Off. . | |
| 1492982 | of 1969 | Fed. Rep. of Germany . | |
| 3034038 | of 1982 | Fed. Rep. of Germany . | |
| T29288 | of 1984 | Hungary . | |
| 986382 | of 1983 | U.S.S.R. . | |

OTHER PUBLICATIONS

Crandall 1987, J. Food Science 52(2) 381.
Berk, "Viscosity of Orange Juice Concentrates:Effect of Ultrasonic Treatment and Concentration", *Food Technology*, vol. 18 (1964), pp. 1811–1812.
Mizrahi & Berk, "Ultrasonic Waves in the Concentration of Citrus Juices", *Process Biochemistry*, vol. 3, No. 10 (1968), pp. 25–27.
Lortkipanidze et al., "Use of a Homogenizer in a Citrus Juice Line", Konservnaya i Ovoshchesushil'naya Promyshlennost', No. 7 (1972), pp. 9–10.
Berishvili, "The Use of Ultrasound in the Production of Fruit Juices", Konservnaya i Ovoshchesushil'naya Promyshlennost', No. 10 (1976), pp. 19–20.
Figli, "Homogenization of Fruit Juices", *Industrie Delle Bevande*, vol. 10, No. 2 (1980), pp. 147–149.
Abstract of Zeh, "Grinding, Homogenizing and Degassing of Pulping Juices", Fluessiges Obst., vol. 51, No. 1 (1984), pp. 14–16.
Baker et al., "Enzymatic Treatment of Orange Juice to Increase Cloud and Decrease Sinking Pulp Level", *Proc. Fla. State Hort. Soc.*, vol. 84 (1971) pp. 197–200.
C A 78:4176c (Overnight Incubation of Orange Juice with Enzymes Decreased Sinking Pulp Level and Viscosity Rapidly).

*Primary Examiner*—Carolyn Paden
*Attorney, Agent, or Firm*—Eric W. Guttag; Chester Cekala; Richard C. Witte

[57] ABSTRACT

Low viscosity orange juice concentrates which are useful in preparing high Brix concentrate products that are less pseudoplastic at freezer temperatures and are more highly dispersible when reconstituted with water are disclosed. These low viscosity orange juice concentrates are obtained by subjecting concentrated orange juice to high shear treatment for a period of time sufficient to reduce the mean particle of the sinking pulp at least about 40 microns and thus lower the viscosity of the concentrated juice. The mean particle size of the sinking pulp in these low viscosity orange juice concentrates is typically about 125 microns or less.

35 Claims, 2 Drawing Sheets

LOW VISCOSITY ORANGE JUICE CONCENTRATES USEFUL FOR HIGH BRIX PRODUCTS HAVING LOWER PSEUDOPLASTICITY AND GREATER DISPERSIBILITY

TECHNICAL FIELD

This application relates to low viscosity orange juice concentrates which are uuseful in preparing high Brix concentrate products that are less pseudoplastic at freezer temperatures and are more highly dispersible when reconstituted with water. This application further relates to a high shear treatment method for obtaining such orange juice concentrates.

In the United States, frozen orange juice concentrate products comprise a substantial portion of all orange juice products consumed. In use, these concentrate products are reconstituted with water to form single-strength, drinkable orange juice beverages. Frozen orange juice concentrates are typically formulated as "3 to 1" products (juice solids content of about 42° Brix). This means that three volumes of water are added to one volume of concentrate product to provide the drinkable beverage.

While 3 to 1 products are the most popular form of frozen orange juice concentrates, consideration has also been given to formulating even more concentrated versions of such products. In particular, frozen orange juice concentrates formulated as "5 to 1" products (i.e., five volumes of water to one volume of concentrate), have been considered. These 5 to 1 products (juice solids content of about 58° Brix) offer the convenience of taking up less storage space in the freezer. In addition, 5 to 1 concentrate products can reduce the cost of shipment, handling and distribution of such products. Also, 5 to 1 concentrate products have greater storage stability against microbial and mold growth.

Formulation of 5 to 1 concentrate products by conventional processing is not without problems. Conventionally prepared 5 to 1 concentrate products are much thicker, less fluid and higher in viscosity than 3 to 1 concentrate products when thawed. These higher viscosity, more thick, less fluid properties make it much more difficult to remove the 5 to 1 concentrate product from the container. When thawed, conventionally prepared 5 to 1 concentrate products also have much poorer water dispersibility compared to 3 to 1 concentrate products.

Various methods have been proposed to solve the problems occasioned by conventionally prepared 5 to 1 concentrate products. One is to lower the background (sinking) pulp level of the concentrate used in preparing the 5 to 1 products. This can be achieved by centrifuging the extracted feed juice prior to concentration to remove sinking pulp. However, removal of sinking pulp from the feed juice can also lower the overall juice yield.

Another method for lowering the viscosity of the concentrate is enzymatic treatment. For example, enzymatic treatment of orange juice can be used to decrease the sinking pulp level and thus its viscosity. See Baker et al, "Enzymatic Treatment of Orange Juice to Increase Cloud and Yield and Decrease Sinking Pulp Level," *Proc. Fla. State Hort. Soc.*, Vol. 84 (1971), pp. 197-200. Enzymatic treatment can also be used to increase the fluidity of the concentrate at freezer temperatures by converting the sucrose present therein to fructose and glucose. See U.S. Pat. No. 4,356,195 to Kahn et al, issued Oct. 26, 1982 (treatment of orange juice concentrate with invertase). The major disadvantage of enzymatic treatment for viscosity reduction/fluidity improvement is that the resulting orange juice concentrate no longer satisfies the "standard of identity" for 100% orange juice products.

Another method for lowering the viscosity of orange juice concentrates used in preparing 5 to 1 products is by ultrasonic treatment. See U.S. Pat. No. 3,352,693 to Berk, issued Nov. 14, 1967, which discloses an orange juice concentrate (soluble solids content of 60° Brix) that is subjected to ultrasonic waves to lower its relative viscosity. Ultrasonic treatment can cause strong off-flavors (garlic, ozone-like, metallic) to develop in the concentrate unless carried out under a vacuum or a nitrogen atmosphere. See Berk, "Viscosity of Orange Juice Concentrates: Effect of Ultrasonic Treatment and Concentration," *Food Technology*, Vol. 18 (1964), pp. 1811-12. In addition, current equipment for carrying out ultrasonic treatment involves a relatively low throughput rate and is therefore not practical for commercial juice concentrate processing operations.

Accordingly, a commercially practical method for lowering the viscosity, improving the fluidity, and increasing the water dispersibility of orange juice concentrates used in preparing 5 to 1 products, without other adverse effects, is needed.

BACKGROUND ART

A. Ultrasonication of Orange Juice Concentrate

U.S. Pat. No. 3,352,693 to Berk, issued Nov. 14, 1967, discloses highly concentrated citrus juices (up to as high as 70° Brix) which are alleged to be considerably less viscous than conventionally prepared juice concentrates. These less viscous, highly concentrated juice materials are obtained by subjecting the juice or concentrate to ultrasonic treatment. Example I discloses an orange juice concentrate (soluble solids content of 60° Brix) which is subjected to ultrasonic waves having a frequency of 20,000 cycles per second. As shown in this Example, the longer the orange juice concentrate was subjected to ultrasonic treatment, the lower was its relative viscosity.

Berk, "Viscosity of Orange Juice Concentrates: Effect of Ultrasonic Treatment and Concentration," Food Technology, Vol. 18 (1964), pp. 1811-12, considers the scientific aspects of ultrasonic treatment of orange juice concentrates. FIG. 1 in this article shows a marked decrease in the relative viscosity of a 60° Brix orange juice concentrate the longer it is subjected to ultrasonic treatment. FIG. 2 in this article compares pulp particles, before and after ultrasonic treatment. Based on this comparison, Berk observed that ultrasonic treatment caused a marked degree of disintegration of the membrane-like pulp particles and says that this effect may have contributed to the decrease in viscosity of the orange juice concentrate. Berk also notes that strong off-flavors (garlic, ozone-like, metallic) develop in the concentrate unless ultrasonic treatment is carried out under a vacuum or a nitrogen atmosphere.

Mizrahi and Berk, "Ultrasonic Waves in the Concentration of Citrus Juices," Process Biochemistry, Vol. 3, No. 10 (1968), pp. 25-27, also considers the scientific aspects of using ultrasonic waves in the concentration of citrus juices. Mizrahi et al say that the suspended particles and pectic substances present in citrus juice are the most important from the standpoint of the viscous structure of the juice. Based on experiments with 1% pectin solutions, they suggest that ultrasonic treatment depolymerizes the pectins present in the juice as the result of direct mechanical shear. They also say that ultrasonic treatment of citrus juice concentrates causes the disintegration of the suspended particles (citing the Berk article), but that the relationship between particle disintegration and viscosity "is not yet understood."

B. Homogenization of Juice Streams, Including Citrus Juice Streams

Lortkipanidze et al, "Use of a Homogenizer in a Citrus Juice Line," Konservnaya i Ovoshchesushil'naya Promyshlennost', No. 7 (1972), pp. 9–10, describes studies involving the incorporation of a homogenizer (OGB-type) into a juice production line. Before incorporation of the homogenizer, the system produced juice containing coarse pulp particles which had to be filtered off prior to bottling. The homogenizer (operated at a pressure of 30 MPa, i.e., about 4350 psi) was incorporated into the system between the vacuum unit for removal of excess essential oils and the vacuum apparatus where the juice was mixed with sugar syrup and deaerated. The juice obtained in the system having the homogenizer had finer sized pulp which did not require filtering prior to bottling.

Berishvili, "The Use of Ultrasound in the Production of Fruit Juices," Konservnaya i Ovoshchesushil'naya Promyshlennost', No. 10 (1976), pp. 19–20, describes the processing of fruit pulp with a rotary type ultrasonic homogenizer to provide completely homogenized single-strength fruit juice with pulp. After processing, the size of the juice particles is disclosed as not exceeding 50 microns (relative to a particle size of 250–300 microns for a control sample). Fruit juices derived from apple, peach, apricot, quince and mandarin fruit were processed in the homogenizer.

DISCLOSURE OF THE INVENTION

The present invention relates to low viscosity orange juice concentrates which are useful in preparing high Brix concentrate products that are less pseudoplastic/more spoonable at freezer temperatures and are more highly dispersible when reconstituted with water, especially at a water:concentrate product volume ratio of 5 to 1. These low viscosity concentrates have the following characteristics:

a. a juice solids content of from about 50° to about 70° Brix;

b. a viscosity of about 5.5 centipoise or less when measured at 8° C. and at 11.8° Brix;

c. a mean sinking pulp particle size of usually about 125 microns or less.

The present invention further relates to a method for obtaining these low viscosity orange juice concentrates. This method comprises the steps of: (a) providing a concentrated orange juice having: (1) a juice solids content of from about 50° to about 70° Brix; and (2) a viscosity of at least about 5 centipoise when measured at 8° C. and at 11.8° Brix; and (b) subjecting the concentrated orange juice to high shear treatment for a period of time sufficient to: (3) reduce the mean sinking pulp particle size by at least about 40 microns; and (4) lower the viscosity of the concentrated orange juice by at least about 0.5 centipoise when measured at 8° C. and at 11.8° Brix.

The key to the relatively low viscosity of these orange juice concentrates is the substantial reduction in mean particle size of the sinking (background) pulp, usually to a mean particle size of about 125 microns or less. Substantially reducing the mean sinking pulp particle size has been found to significantly lower the viscosity of the orange juice concentrates of the present invention, and to impart improvised spoonability and water dispersibility properties to high Brix concentrate products prepared from these concentrates. High shear treatment according to the present invention has been found to be critical in achieving the necessary mean particle size reduction for these low viscosity orange juice concentrates. Importantly, high shear treatment substantially reduces the mean sinking pulp particle size without adversely affecting other desirable properties of the concentrate, in particular its flavor.

A. Definitions

Figure 1:
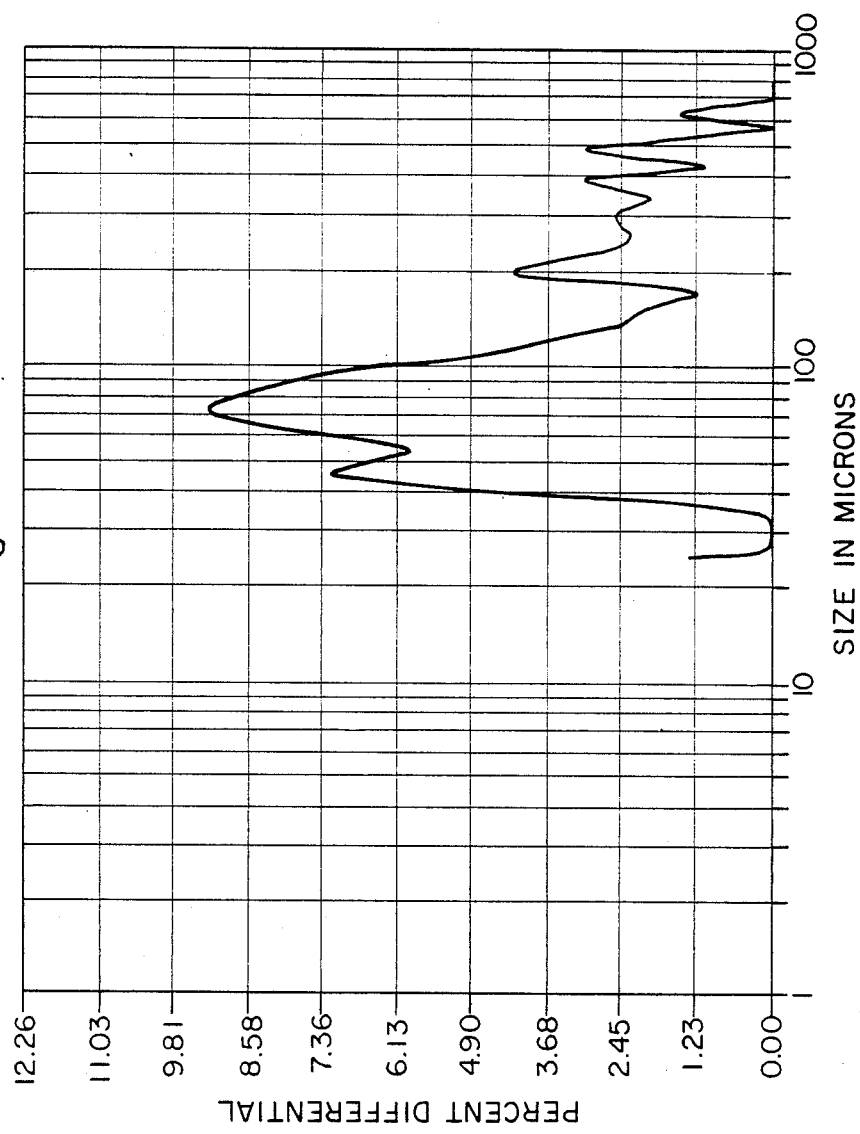
FIG. 1 shows a sinking pulp particle size distribution graph for a 65° Brix orange juice concentrate prior to high pressure homogenization.

As used herein, the term "orange juice" refers to any orange juice composition which comprises at least about 95% orange juice on a single-strength basis.

As used herein, the term "concentrate product" refers to orange juice compositions which are reconstituted with water to form drinkable orange juice beverages. Concentrate products at least comprise concentrated orange juice, orange juice aroma and flavor materials and usually sensible pulp. These concentrate products can also optionally comprise additional edible acids (e.g., citric and/or malic acid), calcium and other minerals, vitamins, and the like. Standard concentrate products sold in the marketplace are typically formulated as "3 to 1" products, i.e. provide drinkable beverages when reconstitued with 3 volumes of water. By contrast, the high Brix concentrate products of the present invention are formulated as 4 to 1 or higher products. Preferred high Brix concentrate products are formulated as 5 to 1 products.

As used herein, the term "concentrated orange juice" refers to any orange juice composition from which water has been removed by any of a variety of concentration methods, including evaporative concentration, freeze concentration, and reserve osmosis concentration.

As used herein, the term "sinking pulp" (also called "background pulp") refers to the finer size pulp present in orange juice which passes through a 20 mesh screen. Sinking pulp usually results from the shredding or cutting of the juice sacs and membrane segments during processing. By contrast, "sensible pulp" refers to pulp which is retained on a 20 mesh screen and which is tactilely sensed by the tongue as particles.

As used herein, the term "comprising" means various components can be conjointly employed in the orange juice composition. Accordingly, the term "comprising" encompasses the more restrictive terms "consisting essentially of" and "consisting of".

B. Low Viscosity Orange Juice Concentrates

The orange juice concentrates of the present invention have a relatively high Brix solids content. Generally, these orange juice concentrates have a juice solids content of from about 50° to about 70° Brix. Preferred orange juice concentrates of the present invention have a juice solids content of from about 58° to about 65° Brix.

The orange juice concentrates of the present invention are characterized by their relatively low viscosity. The orange juice concentrates of the present invention have viscosities of about 5.5 centipoise or less (preferably about 5 centipoise or less) when measured at 8° C. and at a juice solids centent of 11.8° Brix. The viscosity of these orange juice concentrates is typically in the range from about 3 to about 5 centipoise when measured at 8° C. and at 11.8° Brix. Preferred low viscosity orange juice concentrates of the present invention (i.e., juice solids content of from about 58° to about 65° Brix) can have viscosities ranging from about 600 to about 1700 centipoise when measured at 8° C. and at 58° Brix. Typically, these preferred concentrates have viscosities in the range of from about 750 to about 1500 centipoise at 8° C. and at 58° Brix. (The methods for measuring the viscosity of these low viscosity orange juice concentrates at 11.8° Brix and at 58° Brix is described hereafter in part G of this application.)

A particularly important characteristic of the low viscosity orange juice concentrates of the present invention is their sinking pulp mean particle size. Generally, it has been found that, as the mean particle size of the sinking pulp is reduced, the viscosity of the orange juice concentrate is also lowered. Reducing the mean particle size of the sinking pulp basically involves a shift in distribution of the pulp particles from larger size particles to smaller size particles. For low viscosity orange juice concentrates of the present invention, the mean particle size of the sinking pulp is usually about 125 microns or less. For preferred low viscosity orange juice concentrates of the present invention, this mean particle size is typically about 100 microns or less. (The method for measuring the means sinking pulp particle size for these low viscosity orange juice concentrates described hereafter in part G of this application.)

This reduction in mean particle size of the sinking pulp, and the viscosity lowering effects which result therefrom, make the orange juice concentrates of the present invention less pseudoplastic (i.e., more spoonable), especially compared to conventionally prepared concentrates. (Materials which exhibit pseudoplasticity have lower viscosities when subjected to greater shear.) The improved spoonability properties of the low viscosity orange juice concentrates of the present invention are especially apparent at freezer temperatures, e.g. approximately 5° F. (−15° C.) or less. Almost all concentrate products prepared from orange juice concentrates are frozen for the purpose of storage stability. Even when thawed, 5 to 1 products prepared from conventionally processed orange juice concentrates are not easy to pour or spoon out of the can. By contrast, 5 to 1 products prepared from the low viscosity orange juice concentrates of the present invention are more spoonable and pourable at freezer temperatures and can be easily removed from the can or other container in which they are packaged. This makes 5 to 1 products prepared from the low viscosity orange juice concentrates of the present invention very convenient for consumers.

In addition, the reduced mean particle size of the sinking pulp, and the resulting lower viscosity, of the orange juice concentrates of the present invention has also been unexpectedly found to improve their dispersibility in water. Five to one concentrate products containing conventionally prepared orange juice concentrates are generally difficult to disperse in water. Specifically, it has been found that only a portion of the conventionally prepared concentrate rapidly disperses in and combines with the water in from about 10 to about 15 seconds. A fairly substantial lump (or lumps) of concentrate is left which disperses much more slowly in water, e.g. up to as much as 38 seconds. By contrast, the low viscosity orange juice concentrates of the present invention fall apart much more readily and are dispersed fairly completely in water in about 15 seconds or less, preferably in about 10 seconds or less. Again, this makes 5 to 1 concentrate products prepared from these low viscosity orange juice concentrates very convenient for the consumer. (The test for dispersibility of these low viscosity orange juice concentrates is described hereafter in part G of this application.)

The low viscosity orange juice concentrates of the present invention usually have lower measured levels of sinking pulp. Like mean particle size, the level of sinking pulp can also have an effect on the viscosity of the drinkable orange juice beverage resulting from the orange juice concentrate. Generally, lower measured levels of sinking pulp are reflected by a decrease in the viscosity of the resulting orange juice beverage. For the low viscosity orange juice concentrates of the present invention, the measured level of sinking pulp is typically in the range of from about 3 to about 7 volume percent. For preferred low viscosity orange juice concentrates of the present invention, this measured level of sinking pulp is from about 4 to about 6 volume percent. (The method for measuring the sinking pulp level of these low viscosity orange juice concentrates is described hereafter in part G of this application.)

C. High Shear Treatment of Concentrated Orange Juice

The low viscosity orange juice concentrates of the present invention are obtained by subjecting concentrated orange juice to high shear treatment. High shear treatment methods according to the present invention act on the concentrated orange juice by shredding and disintegrating the sinking pulp particles, especially the larger size particles. Usually, high shear treatment refers to methods of treatment having shear rates (calculated) of at least about 300,000 sec.$^{-1}$. Typically, high shear treatment methods useful in the present invention impart shear rates to the concentrated orange juice of from about 300,000 to about 10,000,000 sec.$^{-1}$. Preferred high shear treatment methods impart shear rates of from about 2,000,000 to about 8,000,000 sec.$^{-1}$. Treatment methods imparting these high shear rates to the concentrated juice have been found particularly critical in achieving the desired mean particle size reduction in the sinking pulp. For example, treatment methods which impart lower shear rates of only about 40,000 sec.$^{-1}$ have been found, surprisingly, to be ineffective in achieving the desired reduction in mean particle size of the sinking pulp. (The method for calculating shear rates according to the present invention is described hereafter in part G of this application.)

The degree to which the high shear treatment methods of the present invention can reduce the mean particle size of the sinking pulp is dependent on a variety of factors, in particular the composition of the starting concentrated orange juice. However, high shear treatment methods of the present invention generally reduce the mean particle size of the sinking pulp by at least about 40 microns and preferably at least about 50 microns. The mean particle size reduction achieved by high shear treatment of the concentrated orange juice is usually in the range of from about 50 to about 200 microns. Typically, high shear treatment methods can reduce the mean particle size of the sinking pulp by from about 50 to about 125 microns.

The degree to which the high shear treatment methods of the present invention can lower the viscosity of the concentrated orange juice is also particularly dependent on its composition. However, high shear treatment methods of the present invention generally lower the viscosity of the concentrated juice by at least about 0.5 centipoise, and preferably by at least about 1.5 centipoise, when measured at 8° C. and 11.8° Brix. The viscosity of the concentrated juice is usually lowered by from about 1 to about 5 centipoise after high shear treatment according to the present invention, and more typically by from about 1.5 to about 3 centipoise. For concentrated juices having a solids content of from about 58° to about 65° Brix, the viscosity is usually lowered by at least about 500 centipoise, and preferably by at least about 700 centipoise, when measured at 8° C. and 58° Brix. The viscosity of these 58° to 65° Brix concentrated juices is typically lowered by from about 700 to about 3000 centipoise.

A preferred high shear treatment method according to the present invention is to homogenize the concentrated orange juice under high pressure. High pressure homogenizers typically comprise a reciprocating plunger or piston-type pump together with a homogenizing valve asembly affixed to the discharge end of the homogenizer. Suitable high pressure homogenizers useful in carrying out the method of the present invention include high pressure homogenizers manufactured by APV Gaulin Corporation of Everett, Mass. See U.S. Pat. No. 4,352,573 to Pandolfe, issued Oct. 5, 1982 and U.S. Pat. No. 4,383,769 to Pandolfe, issued May 17, 1983 (herein incorporated by reference) for suitable high pressure homogenizers made by APV Gaulin.

During high pressure homogenization, the concentrated orange juice is subjected to high shear rates as the result of cavitation and turbulence effects. These effects are created by the concentrated juice entering the homogenizing valve assembly from the pump section of the homogenizer at high pressure (and low velocity). Suitable pressures for obtaining high shear rates are at least about 1000 psi, and preferably at least about 3000 psi. Typically, these pressures are in the range of from about 3000 to about 8000 psi. Preferred pressures for carrying out high pressure homogenization are in the range of from about 3000 to about 6000 psi.

As the concentrated juice enters the space between the valve and the seat, its velocity is dramatically increased. There is also a corresponding decrease in vapor pressure, which causes vapor bubbles to form in the concentratred juice. As the concentrated juice flows through the valve-seat area, its velocity is again decreased and the vapor pressure is again increased, resulting in an implosion of the bubbles. Bubble formation and implosion causes the cavitation effects. The intense energy release and turbulence associated with cavitation causes the disruption and disintegration of the sinking pulp particles. As the larger pulp particles are disintegrated, the means particle size of the sinking pulp is accordingly reduced.

Figure 2:
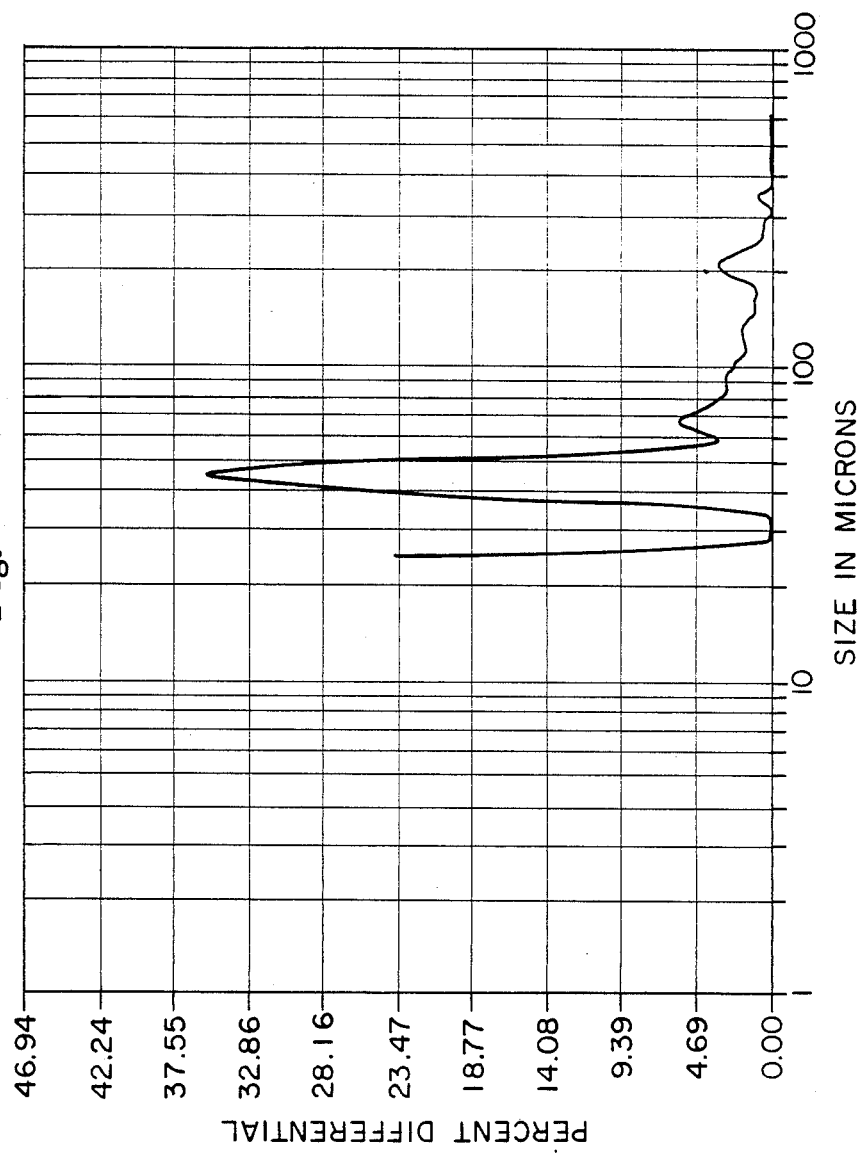
FIG. 2 shows a sinking pulp particle size distribution graph for a 65° Brix orange juice concentrate which has been subjected to high pressuure homogenization according to the method of the present invention.

The ability of high pressure homogenization to greatly reduce the mean particle size of sinking pulp in concentrated orange juice is particularly shown by FIGS. 1 and 2. FIG. 1 represents a volume distribution graph of sinking pulp particle sizes for a 65° Brix Brazilian TASTE concentrate prior to high pressure homogenization. As can be seen, almost all the pulp particles are above 50 microns in size, including a large portion above 100 microns in size. By contrast, FIG. 2 represents a volume distribution graph of sinking pulp particle sizes for the same 65° Brix Brazilian TASTE concentrate after being subjected to high pressure homogenization (two passes through the homogenizer at a pressure of 5000 psi). As can be seen, the particle size distribution has shifted left towards the small size particles, with a large portion of these particles being 50 microns or smaller. This shift in particle size distribution is particularly shown by the fact that the mean particle size of the Brazilian TASTE concentrate was reduced from 166 microns (before high pressure homogenization) to 70 microns (after high pressure homogenization).

High pressure homogenization can be carried out at any suitable temperature. Generally, the temperature is selected to avoid degradation of flavor and other components present in the concentrated orange juice. Also, the concentrated orange juice is generally fed to the homogenizer at sufficiently cold temperature to minimize heat buildup during high pressuure homogenization. Suitable feed temperatures for carrying out this high pressure homogenizatin are typically from about 20° to about 75° F. (from about −6.7° to about 23.9° C.). Preferably, the concentrated juice is fed to the homogenizer at a temperature of from about 20° to about 40° F. (from about −6.7° to about 4.4° C.). Following high pressure homogenization, the concentrated orange juice is typically cooled to a temperature of about 20° F. (−6.7° C.) or less.

The concentrated orange juice is subjected to high pressure homogenization for a period of time sufficient to achieve the necessary reduction in mean particle size of the sinking pulp, as well as to achieve the requisite lowering of viscosity of the concentrated orange juice. Depending upon the particular pressure selected for high pressure homogenization, and the flow rate of concentrated orange juice through the homogenizer, the desired mean particle size reduction and viscosity lowering effects can be achieved by one pass through the high pressure homogenizer. However, more than one pass of the concentrated orange juice through the high pressure homogenizer can be required to achieve the desired mean particle size reduction and viscosity lowering effects depending upon the particular composition of the concentrated juice, especially if lower pressuers are used. Typically, the concentrated orange juice is passed through the high pressure homogenizer from 1 to 3 times. Preferably, the number of passes through the high pressure homogenizer is from 1 to 2.

While high pressure homogenization is the preferred way for carrying out high shear treatment according to the method of the present invention, other high shear treatment methods which achieve the shear rates defined above can also be used. Another example of a suitable high shear treatment method is colloidal milling of the concentrated orange juice. The shear imparting components of a colloidal mill typically comprise a revolving rotor and a fixed stator. The rotor and the stator are configured so as to fit together in working combination, e.g. a truncated cone-shaped rotor and a concave-shaped stator. Suitable colloidal mills useful in carrying out the method of the present invention include those manufactured by APV Gaulin Corp. and those manufactured by Greerco Corp. of Hudson, N.H.

During colloidal milling, the concentrated orange juice is subjected to high shear rates as the result of impact and hydraulic shear forces. As the rotor of the colloidal mill turns, the turbine blades on the upper surface of the rotor create a negative pressure differential which pushes the concentrated juice into a first shearing zone located at the small diameter end of the rotor. The concentrated juice is subjected to high impact and sudden shear, plus centrifugal force, that drives the prebroken droplets of concentrated juice against the sharp teeth of the stator. As the concentrated juice enters the second shearing zone of the colloidal mill, the turbine blades pass in close tolerance to the stator teeth. Serrations formed in the upper surface of the rotor at the base of the turbine blades also rotate rapidly past the stator and cause further comminution of the pulp particles.

With increasing velocity, the concentrated juice containing partially comminuted pulp particles flows through channels formed by the cooperation of the upper surface of the rotor and the lower surface of the stator. The concentrated juice is then subjected to extreme forces of hydraulic shear as it passes through the narrow gap (e.g., on the order of about 0.001 inches (2.5 mm)) between the rotor and the stator. The concentrated juice is finally thrown, by high centrifugal force, from the rotor against the smooth portion of the wall of the stator. This high velocity impingement provides additional size reduction of the sinking pulp particles. As the larger plup particles are disintegrated by this combination of high impact and hydraulic shear forces, the means particle size of the sinking pulp is reduced accordingly.

In terms of processing conditions, colloidal milling of concentrated orange juice can be carried out at temperatuures suitable for high pressure homogenization. Also like high pressure homogenization, collidal milling can be carried out by one or more passes of the concentrated juice through the mill to achieve the desired mean particle size reduction and viscosity lowering effects.

A major advantage of the high shear treatment methods of the present invention is that the viscosity of the resulting orange juice concentrate can be effectively lowered without causing the adverse effects of other viscosity lowering methods. For example, viscosity lowering is achieved in the high shear treatment method of the present invention without any loss in juice yield. The orange juice concentrate resulting from high shear treatment can be used in 100% orange juice products. High shear treatment can also be carried out without the need of inert atmospheres to prevent off-flavor formation.

Subjecting the concentrate orange juice to high shear treatment according to the present invention has been found to be particularly important to achieving a maximum reduction in the mean particle size of the sinking pulp, as well as a substantial lowering of the viscosity of the resulting concentrate. High pressure homogenization of a single-strength orange juice, followed by evaporative concentration, does reduce the mean particle size of the sinking pulp and lower the viscosity of the resulting concentrate relative to the concentrated, unhomogenized juice. However, the viscosity lowering effects are significantly less, relative to high pressure homogenization of concentrated orange juice. For example, it has been unexpectedly found that high pressure homogenization of concentrated orange juice according to the present invention can achieve viscosity lowering benefits about 25% greater than those achieved by high pressure homogenization of single-strength orange juice, followed by evaporative concentration. These greater viscosity lowering benefits are believed to be due to the fact that high pressure homogenization of concentrated juices breaks down pectin/citrate/sugar gels formed by the concentration process, in addition to reducing the sinking pulp particle size.

The high shear treatment method of the present invention can generally be used with any suitable concentrated orange juice having a juice solids content of from about 50° to about 70° Brix. Preferred concentrated orange juices for use in the method of the present invention have a juice solids content of from about 58° to about 65° Brix. Prior to high shear treatment, the viscosity of these concentrated orange juices is generally at least about 5 centipoise (Brazilian) or at least about 6 centipoise (Florida) when measured at 8° C. and at 11.8° Brix. Usually, the viscosity of these concentrated orange juices are in the range from about 5 to about 10 centipoise at 8° C. and at 11.8° Brix. For concentrated juices having a juice solids content of from about 58° to about 65° Brix, the viscosity is usually at least about 1700 centipoise, more typically at least about 2000 centipoise, when measured at 8° C. and at 58° Brix, with a typical viscosity range of from about 2000 to about 5000 centipoise.

Prior to high shear treatment, these concentrated orange juices usually have a sinking pulp level at least about 7 volume %, with a typical range of from about 7 to about 10 volume %. After high shear treatment, the sinking pulp level of the resulting low viscosity orange juice concentrate is typically reduced to from about 3 to about 7 volume %. This lower sinking pulp level is due to the fact that the sinking pulp particles are generally much smaller in size after high shear treatment and are thus more easily compacted by centrifugation of the concentrate sample prior to the sinking pulp level measurement. Since the sinking pulp level is a volume measurement, the lower values for the orange juice concentrates of the present invention reflect this compaction of smaller pulp particles.

Within the above defined characteristics, concentrated orange juices useful in the high shear treatment method of the present invention can be obtained by any suitable concentration process. For example, suitable concentrated orange juice can be obtained by freeze concentration. Freeze concentration typically involves passing the serum portion of a single-strength feed juice thorugh a scraped wall heat exchanger to form substantially pure ice crystals which are then separated from the concentrated juice. A preferred freeze concentration method is disclosed in U.S. Pat. No. 4.374,865 to Strobel, issued Feb. 22, 1983, which is incorporated by reference. Concentrated orange juice can also be obtained by the use of reverse osmosis membranes.

Typically, the concentrated orange juice is obtained by evaporative concentration. Examples of suitable evaporators for obtaining such concentrated juices include the falling film-type, or, more typically, temperature accelerated short time evaporators (TASTE). See Nagy et al, *Citrus Science and Technology*, Vol. 2 (1977), at pages 217–18 (herein incorporated by reference), which discloses a standard 7-stage, 4-effect TASTE evaporator system for preparing suitable concentrated orange juice.

From the standpoint of having less cooked off-flavor, preferred concentrated juices for use in the high shear treatment method of the present invention can be obtained by the evaporative concentration process disclosed in part C of U.S. application Ser. No. 052,089, to Piotrowski, Ross, Strobel, Thundathil and Tsai, filed May 18, 1987, which is incorporated by reference. These preferred concentrated juices are obtained by initially heating a feed juice having a juice solids content of from about 9° to about 14° Brix in one or more Sigmastar ® plate evaporators to a temperature in the range of from about 95° to about 160° F. to provide a preconcentrated feed juice having a juice solids content of from about 15° to about 25° Brix. This preconcentrated feed juice is then heated under vacuum in one or more Sigmastar ® plate evaporators to temperatures in the range of from about 160° to about 180° F. under conditions of high shear across the heated surface of each evaporator to provide an intermediately concentrated juice having a juice solids content of from about 25° to about 40° Brix. This intermediately concentrated juice is then heated in one or more Sigmastar ® plate evaporators to temperatures in the range of from about 170° to about 100° F. and then rapidly cooled to a temperature of about 65° F. or less to provide the concentrated orange juice having less cooked off-flavor.

This concentrated juice having less cooked off-flavor can also be obtained by an alternative, less preferred evaporative concentration process also disclosed in part C of the above Piotrowski et al application. This alternative process uses a centrifugal cone evaporator (e.g. a Centri-Therm evaporator). The starting feed juice is heated by the underside surface of the rotating member of the evaporator under a vacuum to a maximum temperature of from about 100° to about 135° F. and then subsequently cooled to a temperature of about 90° F. to provide the concentrated orange juice having less cooked off-flavor.

These preferred concentrated orange juices are obtained by concentration of the "more like hand-squeezed" feed juices disclosed in part A of the above Piotrowski et al application. These preferred feed juices are characterized by minimized levels of peel oil and flavanoid glycosides and especially by lower viscosities and minimized levels of sinking pulp. These preferred feed juices are obtained by processing the orange fruit under gentle extraction and finishing conditions, followed by centrifugation to lower the viscosity and reduce the sinking pulp level.

D. Formulation of High Brix Orange Juice Concentrate Products

The high Brix orange juice concentrate products of the present invention can be formulated by appropriate blending of: (a) the low viscosity orange juice concentrate obtained by high shear treatment or concentrated orange juice as described in part C of this application: (b) orange aroma and flavor materials; (c) optionally, but preferably sensible pulp; and (d) the balance water, if necessary. The amount of low viscosity concentrate included in these high Brix products depends upon the solids content desired. Generally, the low viscosity concentrate is included in amount sufficient to provide a juice solids content of from about 50° to about 70° Brix in the concentrate product. For preferred 5 to 1 products, the low viscosity concentrate is included in an amount sufficient to provide a juice solids content of from about 55° to about 60° Brix.

The low viscosity orange juice concentrates used in preparing these high Brix concentrate products typically comprise a blend of concentrates (before or after high shear treatment) having various ratios of Brix solids to titratable acidity (TA). This blend can be formulated to have any suitable Brix solids to TA ratio. Typically, this Brix solids to TA ratio can range from about 12 to about 20. Preferred low viscosity orange juice concentrate blends have a Brix solids to TA ratio of from about 14 to about 17.

In addition to the Brix solids to TA ratio, the low viscosity orange juice concentrates used in formulating these high Brix concentrate products typically involve a blend of concentrates (before or after high shear treatment) derived from different varieties of orange fruit. These concentrates are typically derived from Florida Early/Midseason and Valencia fruit. Concentrates obtained from Florida Valencia orange fruit are particularly preferred for high Brix concentrate products of the present invention. Concentrates obtained from other orange fruit, in particular Brazilian Valencia fruit, can also be formulated together with concentrates obtained from Florida Early/Midseason and Valencia fruit. Typically, the low viscosity orange juice concentrate used in formulating the high Brix concentrate products of the present invention comprises the following blends of concentrate: from 0 to about 50% concentrate derived from Florida Early/Midseason fruit; from about 0 to 100% concentrate derived from Florida Valencia fruit; and from 0 to about 85% concentrate derived from Brazilian Valencia fruit. Preferably, this concentrate blend comprises from 0 to about 40% concentrate derived from Florida Early/Midseason fruit; from about 15 to 100% concentrate derived from Florida Valencia fruit; and from 0 to about 85% concentrate derived from Brazilian Valencia fruit.

Low viscosity orange juice concentrates obtained from freeze concentrated orange juice or reverse osmosis concentrated orange juice usually have adequate levels and balance of orange aroma and flavor materials. However, the low viscosity orange juice concentrates obtained from concentrated orange juice which has been subjected to evaporative processes are fairly bland in terms of orange aroma and flavor. Accordingly, materials need to be added to these evaporative orange juice concentrates to impart the characteristic aroma and flavor of orange juice. Suitable sources of orange aroma/flavor materials include commercial orange essences, commerical orange oils and cold-pressed peel oils. Non-orange sources of natural flavoring can also be used as sources of aroma/flavor materials. Concentrated aroma and flavor materials are preferred for inclusion due to high juice solids content required for the concentrate products of the present invention.

The orange aroma and flavor materials are included in amounts and ratios effective to provide the orange aroma and flavor properties desired in the high Brix concentrate product. The particular aroma and flavor effects desired can be any suitable to those skilled in the orange juice industry. For example, the high Brix concentrate products of the present invention can be formulated to have any suitable level of titratable (peel) oil. The titratable oil content of these concentrates is generally about 0.025% or less. The range of titratable oil content is typically from about 0.010 to about 0.020%. (The titratable oil content of these high Brix concentrate products can be measured by the Scott Oil Method disclosed in Nagy et al, *Citrus Science and Technology*, Vol. 2 (1977), pp. 506–508, which is incorporated by reference.)

The source of sensible pulp for formulating high Brix concentrate products of the present invention can include any commercial source of sensible pulp which is fairly bland in flavor and which has not been excessively abused or damaged. The high Brix concentrate products of the present invention can be formulated to have any suitable level of sensible pulp. Generally, the level of sensible pulp can range from about 2 to about 14%. Preferred high Brix concentrate products of the present invention have a sensible pulp level from about 4 to about 9%.

Any suitable order of blending can be used to formulate the high Brix concentrate products of the present invention. A typical blending sequence in the preparation of these high Brix concentrate products is as follows:

The orange aroma and flavor materials and sensible pulp are added to a portion of the low viscosity orange juice concentrate and then mixed. The remaining portion of concentrate is then added and mixed in. If necessary, water is added and mixed in to adjust the juice solids content.

This blending sequence is typically carried out at a temperature of from about 20° to about 30° F. (from about −6.7° to about −1.1° C.). Once formulated, the high Brix concentrate products of the present invention can be filled into cans or other appropriate containers, and are then typically chilled or frozen for distribution and consumer storage.

E. Specific Illustrations of the Significance of High Pressure Homogenization of Concentrated Orange Juice According to the Present Invention The following illustrate the significance of high pressure homogenization of concentrated orange juice in accordance with the present invention:

1. General Applicability to Various Concentrated Juices

65° Brix Brazilian, Florida Early-Midseason, and Florida Valencia TASTE concentrates, as well as a 65° Brix Florida Valencia concentrate obtained by the preferred evaporative process of Piotrowski et al, were processed 1 to 3 times through a two-stage APV Gaulin model M3 homogenizer. The concentrates were fed to the homogenizer at a temperature of about 37° F. (2.8° C.). The first stage pressure of the homogenizer was set at 500 psi, with the second stage pressure being varied over the range of from 1000 to 5000 psi. Shear rates under these conditions were estimated to be in the range of 1 to 10 million seconds$^{-1}$. The resultant homogenized concentrates were collected and subsequently evaluated for dispersion characteristics, concentrate and single strength viscosities, mean pulp particle size, and sinking pulp levels as shown below:

| Concentrate | Treatment | Dispersion Time (secs) | Sinking Pulp (%) | Mean Particle Size (Micron) | Concentrate Viscosity (cps) | Single-strength Viscosity (cps) |
|---|---|---|---|---|---|---|
| Brazilian | Untreated | 18 | 7 | 166 | 1736 | 5.7 |
| Brazilian | 1 × 5000 psi | 10 | 4 | 110 | 989 | 3.9 |
| Brazilian | 2 × 5000 psi | 10 | 5 | 70 | 712 | 3.2 |
| Early-Mid | Untreated | 23 | 8 | 196 | 2927 | 7.9 |
| Early-Mid | 1 × 1000 psi | 18 | 7 | 186 | 2594 | 6.5 |
| Early-Mid | 1 × 3000 psi | 13 | 6 | 127 | 2044 | 5.5 |
| Early-Mid | 1 × 5000 psi | 13 | 6 | 103 | 1676 | 4.8 |
| Early-Mid | 2 × 5000 psi | 10 | 4 | 84 | 1489 | 4.2 |
| Valencia | Untreated | 38 | 8 | 121 | 3210 | 7.0 |
| Valencia | 1 × 5000 psi | 15 | 6 | 67 | 1645 | 4.6 |
| Valencia | 3 × 5000 psi | 13 | 6 | 60 | 1350 | 3.8 |
| Piotrowski et al | Untreated | 22 | 9 | 252 | 2251 | 6.3 |
| Piotrowski et al | 1 × 5000 psi | 12 | 6 | 151 | 1237 | 4.6 |

The above data demonstrates the broad applicability of high pressure homogenization across a wide variety of concentrate feed stocks. Progressive treatment by either higher pressures or multiple passes resulted in reduction of both sinking pulp level and mean particle size of the pulp. In addition, progressive reductions of both concentrate and single strength viscosities and improvements in dispersion characteristics upon dilution, were obtained. As the above data also shows with regard to the Florida Early/Midseason and Valencia TASTE concentrates, concentrates having high initial viscosities can require more treatment (i.e., more passes through the homogenizer) to achieve the desired benefits. Flavor evaluations of the treated concentrates versus the respective untreated concentrates demonstrated no off-flavors as a result of the treatment. This was also confirmed in 5 to 1 concentrate products containing added orange aroma and flavor materials (i.e., essences and oils), and sensible pulp.

The homogenized Brazilian TASTE and Piotrowski et al concentrates obtained above were also evaluated for storage stability over a 12 week period, at 0° F. (−17.8° C.) as shown below:

| | Age (weeks) | Piotrowski et al | | Brazilian | | |
|---|---|---|---|---|---|---|
| | | Untreated | 1 × 5000 psi | Untreated | 1 × 5000 psi | 2 × 5000 psi |
| Single Strength Viscosity (cps) | 0 | 6.8 | 4.3 | 5.5 | 4.0 | 4.0 |
| | 4 | 6.7 | 4.7 | 5.9 | 3.8 | 4.0 |
| | 8 | 6.9 | 4.1 | 5.9 | 3.8 | 3.8 |
| | 12 | 6.4 | 4.6 | 5.8 | 3.8 | 4.2 |
| Concentrate Viscosity (cps) | 0 | 2251 | 1237 | 1736 | 989 | 712 |
| | 4 | 2120 | 1060 | 1640 | 858 | 777 |
| | 8 | 2296 | 1244 | 1898 | 979 | 908 |
| | 12 | 2236 | 1186 | 1923 | 828 | 833 |

-continued

| | Age (weeks) | Piotrowski et al | | Brazilian | | |
|---|---|---|---|---|---|---|
| | | Untreated | 1 × 5000 psi | Untreated | 1 × 5000 psi | 2 × 5000 psi |
| Sinking | 0 | 9 | 6 | 7 | 4 | 5 |
| Pulp (%) | 4 | 8 | 4 | 7 | 4 | 4 |
| | 8 | 8 | 6 | 6 | 4 | 5 |
| | 12 | 7 | 6 | 7 | 6 | 4 |
| Ascorbic | 0 | 400 | 413 | 434 | 434 | 431 |
| Acid (ppm) | 4 | 444 | 443 | 459 | 438 | 446 |
| | 8 | 434 | 401 | 467 | 463 | 459 |

The above data demonstrates that the viscosity reduction effects of high pressure homogenization are not reversible. The ascorbic acid analyses suggest that no oxidative degradation has occurred as a result of treatment.

2. Importance of High Shear Rates

A 65° Brix Brazilian concentrate was pumped at 40° F. (4.4° C.) through a three-stage Tekmar in-line mixer operating at a shear rate of about 40,000 seconds$^{-1}$. The treated concentrate was evaluated versus the untreated concentrate as shown below:

| | Untreated | Treated |
|---|---|---|
| Concenrate Viscosity (cps) | 1540 | 1500 |
| Single-Strength Viscosity (cps) | 6.0 | 5.7 |
| Mean Pulp Particle Size (microns) | 233 | 213 |
| Sinking Pulp (%) | 8 | 7 |

The small change in both pulp particle size and viscosity shown above for treatment of the concentrated juice in the low shear rate Tekmar mixer demonstrates the importance of high shear rates according to the method of the present invention.

3. Post-Treatment of Concentrated Juice Versus Pre-Treatment

Florida Hamlin packing house grade fruit was extracted on an FMC Model 391 extractor operating with "standard" juicing components consisting of 3 inch cups, a 7/16 inch long restrictor, and a 0.04 inch strainer tube. The extractor was set at a 5/16 inch peel clearance, and a 182 inch beam setting. After extraction, the juice was finished through an 18 mesh Liquatex vibratory screen to remove large sensible pulp. The finished juice had a solids content of 9.3° Brix, a viscosity of 9.3 centipoise and a mean pulp particle size of 452 microns.

One portion of the finished juice was concentrated (control), followed by high pressure homogenization (post-treatment). Another portion of the finished juice was subjected to high pressure homogenization to provide an homogenized juice having a mean sinking pulp particle size of 181 microns and a viscosity of 5 centipoise at 11.8° Brix, followed by evaporative concentration (pretreatment). In each case, evaporative concentration was carried out in a rotovap evaporator temperature controlled with a hot water bath to a temperature of 78° to 82° C. under a vacuum of 20 to 25 inches Hg. All concentrates obtained had juice solids content of from 65° to 67° Brix. High pressure homogenization was carried out by one pass through an APV Gaulin Model M15 lab homogenizer operating at a pressure of 3,000 psi.

The results of this evaluation are shown below:

| | Control | Pretreated | Post Treated |
|---|---|---|---|
| Sinking Pulp (%) | 10 | — | 10.5 |
| Mean Pulp Particle Size (micron) | 328 | 237 | 252 |
| Concentrate Viscosity (cps) | 2820 | 1785 | 1420 |
| Single-strength Viscosity (cps) | 6.7 | 6.7 | 4.7 |

From the above data, it is apparent that post treatment of the concentrated juice according to the present invention yields a lower viscosity concentrate versus pretreatment of the finished juice, followed by concentration.

F. Specific Illustration of High Brix Concentrate Product Prepared According to the Present Invention The following illustrates the preparation of a high Brix concentrate product in accordance with the present invention:

85/15 blends of Brazilian TASTE concentrate and Florida Valencia concentrate obtained by the preferred Piotrowski et al process were fed at 25° F. (−3.9° C.) through an APV Gaulin homogenizer set at a flow rate of 8 gpm (30 lpm). The first stage pressure of the homogenizer was set at 500 psi, while the second stage pressure was set at 4000 psi. The homogenized blends were cooled to 20° F. (−6.7° C.) by passage through a plate and frame heat exchanger before holding in a cold walled tank. Composite results for the 4 batches of concentrate blend processed were as follows:

| | Untreated | Homogenized |
|---|---|---|
| Concentrate Viscosity (cps) | 2030 | 1098 |
| Single Strength Viscosity (cps) | 6.4 | 4.0 |
| Sinking Pulp (%) | 9 | 5 |
| Particle Size (microns) | 237 | 124 |

Orange aroma and flavor materials (i.e., essences and oils), water and sensible pulp were added to the homogenized concentrate blends. The formulation was adjusted to a solids content of 58° Brix, mixed for 30 minutes, and then cooled. The resultant 5 to 1 concentrate product was packed on a commercial packing line into fiber cans and frozen by passage through a freeze tunnel before storage. Upon reconstitution with water, the 5 to 1 product immediately dissolved without difficulty.

G. Analytical, Test and Calculation Methods Section

1. Viscosity a. At Single Strength (11.8° Brix)

Into a sample cup of a UL-adaptor is poured 16 ml. of a viscosity standard (known viscosity of 5 to 10 centipoise). A Brookfield LVTD rotational viscometer is set up with the UL-adaptor being placed in a 25° C. waterbath. The viscosity standard in the sample cup is allowed to equilibrate in the waterbath for 10 minutes before a reading is taken at 12 rpm. The known viscosity of the viscosity standard is divided by the average dial reading at 12 rpm to determine the response factor.

Sensible pulp is removed from the concentrate sample (after dilution with water to a solids content of 11.8° Brix) by passing it through a 20 mesh screen. Into the sample cup of the UL-adaptor is poured 16 ml. of the screened sample. The UL-adaptor of the viscometer is placed in an 8° C. waterbath. The screened sample is allowed to equilibrate in the waterbath for 15 minutes before a reading is taken at 12 rpm. The viscosity of the screened sample at 12 rpm is determined by multiplying the dial reading by the response factor.

b. At Concentrate Strength (58° Brix)

The viscosity of the concentrate sample (adjusted, if necessary, to 58° Brix with distilled water) is measured with an LVT Brookfield viscometer using a No. 4 spindle in an 8 oz. (236 ml.) sample container of 1.25 in. (3.18 cm) inner diameter. The concentrate sample is allowed to equilibrate in an 8° C. waterbath for 15 minutes before a reading is taken at 60 rpm. The viscosity of the concentrate sample is determined by multiplying the dial reading taken at 60 rpm with the appropriate response factor. The response factor is determined by calibration of the viscometer with a standard of known viscosity in the range of from 2000 to 5000 centipoise as in method a. above.

2. Mean Particle Size of Sinking Pulp

The concentrate sample is diluted to single strength (11.8° Brix) and then screened through a 20 mesh screen prior to the particle size analysis. The screened sample is analyzed with an Hiac-Royco model 4300 multi-channel particle size analyzer with a G-1000 sensor. The thirty-two channels are set to cover sizes ranging from 25 microns to 800 microns. An IBM PC computer with a Size Distribution Software (SDS) package (Part No. 496-0004) supplied by Hiac-Royco is used for data acquisition and processing.

About 10 ml of the screened sample is added to 1000 ml of distilled water in the reservoir of the sampler, and is then pumped through the sensor at a flow rate of 1000 ml per minute with a continuous supply of fresh distilled water. The particle counter is set to count up to 100,000 particles per sample. Based on the resulting volume distribution, the mean particle size of the sinking pulp in the sample is calculated by the IBM computer/SDS package.

Representative volume distribution graphs from this analysis are shown in FIGS. 1 and 2. The particle sizes (in microns) are shown along the x-axis. The percent differential, which is the same as the volume percentage of particles at each particular size, is shown along the y-axis.

3. Dispersibility Test

The dispersion characteristics of the concentrate is measured by following the rate at which a sample reaches a juice solids content of 11.8° Brix after dilution with water. The time at which this solids content is reached is defined as the dispersion time for a given sample.

A G. K. Heller type HST10N mixer having a motor controller to regulate rpm is used in the method. Sufficient concentrate to provide 400 grams of 11.8° Brix single strength juice is placed in a 1 quart (946 ml.) beaker. Room temperature distilled water is then added to the beaker. The contents of the beaker are agitated at 1500 rpm for 5 second intervals with a 4 blade turbine mixer. After 5 seconds, the mixer is stopped and the solids content (°Brix) of the solution is read by using a calibrated refractometer. If the solids content has not reached 11.8° Brix, mixing is continued for additional 5 second intervals until a solids content of 11.8° Brix is achieved. Triplicate runs are averaged to calculate the dispersion time for a given sample.

4. Volume % Sinking Pulp

The concentrate sample is stirred enough to obtain a uniform sample. Water is added to dilute the concentrate sample to 11.8° Brix. Sensible pulp is removed from the diluted sample by passing it through a 20 mesh screen. The screened sample is equilibrated to a temperature of 80°±2° F. Two conical 50 ml. graduated tubes are then filled with exactly 50 ml. each of the well-mixed, equilibrated sample. The tubes are placed in the centrifuge (IEC Model HN-SII, IEC Centrifuge Head #215, IEC Trunnion rings #325, IEC Shields #320) so that the graduated scale faces the direction of rotation. With the load balanced, the samples are centrifuged at 1500 rpm for 10 minutes. The mls. of pulp at the bottom of each tube is read to the nearest ml. and then multiplied by 2 to get the volume % of sinking pulp. The values for the tubes are averaged to obtain the volume % of sinking pulp for sample.

5. Calculation of Shear Rates

Orange juice viscosity can be described as a pseudoplastic fluid, in contrast to the Newtonian behavior of water or a sugar solution. If measurements are made at different velocity gradients (shear rates), the ratio of shear stress (ST) to shear rate (SR) will not be constant. This ratio is frequently called the apparent viscosity (Ua) which decreases as the shear rate is increased. The shear stress is the force per unit area required to keep the fluid moving, while the shear rate is the velocity gradient perpendicular to the direction of flow.

The behavior of pseudoplastic fluids can be described by the equation $$ST = K \times SR^n$$

or the equation:

$$Ua = ST/SR = K \times SR^{(n-1)}$$

where K and n are the fluid consistency and shear index constants, respectively. These equations are described in further detail in *Perry's Chemical Engineering Handbook*, 4th Edition, pp. 5–14 and pp. 5–35 to 5–38.

The shear rate for a colloid mill (e.g. Greerco) having a 7.5 inch diameter (D) rotor operating at 3550 rpm with a 0.020 inch gap setting between the stator and rotor is defined by the equation:

$$SR = \text{Velocity Gradient/Distance Gradient} = \text{Tip Speed/Gap}$$

where the Tip Speed is defined by the equation:

$$\text{Tip Speed} = 3.1416 \times D \times \text{rpm}.$$

Substitution of the numerical values given above yields a calculated shear rate of 697042.5 sec.$^{-1}$.

The shear rate for a high pressure homogenizer (e.g. APV Gaulin) is calculated from the dimensions of the valves and volumetric capacity of product at a given operating pressure. Representative valve dimensions and capacities are given in U.S. Pat. No. 4,352,573 to Pandolfe, Issued Oct. 5, 1982. A homogenizer operating at 2000 psi achieves 500 gallon per hour capacity through a valve having a 0.001 inch width and a 6.9 inch length. The shear rate (SR) for homogenization is defined as follows:

SR = Velocity Gradient/Distance Gradient = Bulk Velocity/Gap where the Bulk Velocity is calculated from the volumetric flowrate (Q), product density (PD), and valve gap (G) and length (L) dimensions according to the following equation:

Bulk Velocity = $Q/(PD \times G \times L)$.

Using 65° Brix orange juice concentrate density of 10.977 lb./gallon, and the numerical values given above yields a shear rate of 4627851 sec.$^{-1}$.

What is claimed is:

1. A low viscosity orange juice concentrate having the following characteristics:
   a. a juice solids content of from about 50° to about 70° Brix;
   b. a viscosity of about 5.5 centipoise or less when measured at 8° C. and at 11.8° Brix;
   c. a mean sinking pulp particle size of about 125 microns or less
   wherein said low viscosity orange juice concentrate is producible by high shear treatment of an orange juice concentrate by a process selected from the group consisting of high pressure homogenization and colloid milling.

2. The concentrate of claim 1 which has a sinking pulp level of from about 3 to about 7 volume %.

3. The concentrate of claim 2 which has a sinking pulp level of from about 4 to about 6 volume %.

4. The concentrate of claim 2 wherein said mean particle size is about 100 microns or less.

5. The concentrate of claim 2 which has a viscosity of from about 3 to about 5 centipoise when measured at 8° C. and at 11.8° Brix.

6. The concentrate of claim 2 which has a juice solids content of from about 58° to about 65° Brix.

7. The concentrate of claim 6 which has a viscosity of from about 600 to about 1700 centipoise when measured at 8° C. and at 58° Brix.

8. The concentrate of claim 7 which has a viscosity of from about 750 to about 1500 centipoise when measured at 8° C. and at 58° Brix.

9. The concentrate of claim 2 which is completely dispersed in water in about 15 seconds or less.

10. The concentrate of claim 9 which is completely dispersed in water in about 10 seconds or less.

11. A high Brix concentrate product, which comprises:
   (a) the low viscosity orange juice concentrate of claim 2 in an amount sufficient to provide a juice solids content of from about 50° to about 70° Brix; and
   (b) an effective amount of orange aroma and flavor materials.

12. The product of claim 11 which further comprises sensible pulp in an amount of from about 2 to about 14%.

13. The product of claim 12 wherein the low viscosity concentrate is in an amount sufficient to provide a juice solids content of from about 55° to about 60° Brix.

14. The product of claim 13 wherein said sensible pulp is in an amount of from about 4 to about 9%.

15. A method for obtaining low viscosity orange juice concentrates, said method comprising the steps of:
   (a) providing a concentrated orange juice having: (1) a juice solids content of from about 50° to about 70° Brix; and (2) a viscosity of at least about 5.0 centipoise when measured at 8° C. and at 11.8° Brix; and
   (b) subjecting the concentrated orange juice to high shear treatment by a process selected from the group consisting of high pressure homogenization and colloid milling for a period of time sufficient to: (3) reduce the mean particle size of the sinking pulp by at least about 40 microns; and (4) lower the viscosity of the concentrated orange juice by at least about 0.5 centipoise when measured at 8° C. and at 11.8° C.

16. The method of claim 15 wherein the concentrated juice is subjected to shear rates of at least about 300,000 sec$^{-1}$ during step (b).

17. The method of claim 16 wherein the concentrated juice of step (a) has a sinking pulp level of at least about 7 volume %.

18. The method of claim 17 wherein the mean particle size of the sinking pulp is reduced by at least about 50 microns and wherein the viscosity of the concentrated juice is lowered by at least about 1.5 centipoise, when measured at 8° C. and at 11.8° Brix, during step (b).

19. The method of claim 17 wherein the concentrated juice of step (a) has a viscosity of from about 5 to about 10 centipoise when measured at 8° C. and at 11.8° Brix, and a sinking pulp level of from about 7 to about 10 volume %.

20. The method of claim 17 wherein the mean particle size of the sinking pulp is reduced by from about 50 to about 200 microns during step (b).

21. The method of claim 20 wherein the mean particle size of the sinking pulp is reduced by from about 50 to about 125 microns during step (b).

22. The method of claim 21 wherein the sinking pulp level is reduced to from about 3 to about 7 volume % during step (b).

23. The method of claim 16 wherein the concentrated juice of step (a) has: (1) a juice solids content of from about 58° to about 65° Brix; and (2) a viscosity of at least about 1700 centipoise when measured at 8° C. and 58° Brix.

24. The method of claim 23 wherein the viscosity of the concentrated juice is lowered by at least 500 centipoise, when measured at 8° C. and at 58° Brix, during step (b).

25. The method of claim 24 wherein the viscosity of the concentrated juice is lowered by from about 700 to about 3000 centipoise during step (b).

26. The method of claim 16 wherein the concentrated juice is subjected to shear rates of from about 300,000 to about 10,000,000 sec$^{-1}$ during step (b).

27. The method of claim 26 wherein the concentrated juice is subjected to shear rates of from about 2,000,000 to about 8,000,000 sec$^{-1}$ during step (b).

28. The method of claim 16 wherein step (b) is carried out by passing the concentrated juice through a homogenizer at a pressure of at least about 1000 psi.

29. The method of claim 28 wherein the pressure is at least about 3000 psi.

30. The method of claim 29 wherein the concentrated juice is passed through the homogenizer from 1 to 3 times at a pressure of from about 3000 to about 8000 psi.

31. The method of claim 30 wherein the concentrated juice is passed through the homogenizer from 1 to 2 times.

32. The method of claim 30 wherein the concentrated juice is fed to the homogenizer at a temperature of from about 20° to about 40° F. (from about −6.7° to about 4.4° C.).

33. The low viscosity orange juice concentrate made by the method of claim 28.

34. The method of claim 16 wherein step (b) is carried out by passing the concentrated juice through a colloid mill.

35. The low viscosity orange juice concentrate made by the method of claim 15.

* * * * *